United States Patent [19]

Tomida et al.

[11] Patent Number: 5,166,008
[45] Date of Patent: Nov. 24, 1992

[54] POLYMER GEL-COATED CONDUCTOR, METHOD OF PRODUCING THE SAME, AND ELECTRIC CELL MAKING USE OF THE SAME

[75] Inventors: Yoshinori Tomida, Atsugi; Satoshi Yuasa, Yokohama; Masanori Sakuranaga, Atsugi, all of Japan

[73] Assignee: Canon Kabushiki Kaisha, Tokyo, Japan

[21] Appl. No.: 764,075

[22] Filed: Sep. 23, 1991

Related U.S. Application Data

[63] Continuation of Ser. No. 490,511, is a continuation of Ser. No. 330,801, Mar. 30, 1989, abandoned.

[30] Foreign Application Priority Data

| Mar. 31, 1988 | [JP] | Japan | 63-76225 |
| Apr. 7, 1988 | [JP] | Japan | 63-84072 |
| Mar. 16, 1989 | [JP] | Japan | 1-62236 |

[51] Int. Cl.$^5$ ............................ H01M 4/04
[52] U.S. Cl. ........................ 429/137; 429/190; 429/192; 429/217; 205/60; 205/62; 205/64; 205/66
[58] Field of Search ............... 429/137, 190, 192, 213, 429/217; 204/2.1; 205/60, 62, 64, 66

[56] References Cited

U.S. PATENT DOCUMENTS

| 2,859,268 | 11/1958 | Fischbach | 204/2.1 |
| 2,866,840 | 12/1958 | Dittmann | 429/217 |
| 4,245,016 | 1/1981 | Rampel | 429/217 |
| 4,281,047 | 7/1981 | Danzig | 429/217 |
| 4,601,919 | 7/1986 | Asami et al. | 429/217 |
| 4,731,311 | 3/1988 | Suzuki et al. | 429/213 |
| 4,824,745 | 4/1989 | Ogawa et al. | 429/213 |
| 4,835,076 | 5/1989 | Heinze et al. | 429/213 |

FOREIGN PATENT DOCUMENTS

| 0292905 | 5/1987 | European Pat. Off. . |
| 1604735 | 12/1981 | United Kingdom . |

OTHER PUBLICATIONS

S. E. Lindsay and G. B. Street, "Conductive Composites from Polyvinyl Alcohol & Polypyrrole", Synthetic Metals, 10 (1984/85), pp. 67–69.
O. Niwa and T. Tamamura, "Electrochemical Polymerization of Pyrrole on Polymer-Coated Electrodes", J. Chem. Soc. Chem, Commun. 1984, pp. 817–818.
M. A. De Paoli et al., "Conductive Composites from Poly (vinyl Chloride) and Polypyrrole", J. Chem. Soc. Chem. Commum., 1984, pp. 1015–1016.

Primary Examiner—Stephen Kalafut
Attorney, Agent, or Firm—Fitzpatrick, Cella, Harper & Scinto

[57] ABSTRACT

A polymer-gel-coated conductor has a conductor member and a cross-linked polymer in a gel state. The polymer in gel state contains an electrolyte and coats the conductor member. An oxidative product or a reduction product of an organic matter or an inorganic matter has been precipitated on the surface of the conductor member or in the region of the polymer in gel state near the surface of the conductor member. Also disclosed are a method of producing the polymer-gel coated conductor and an electric cell in which at least one of a pair of electrodes is made of the polymer-gel-coated conductor.

20 Claims, 3 Drawing Sheets

POLYMER GEL-COATED CONDUCTOR, METHOD OF PRODUCING THE SAME, AND ELECTRIC CELL MAKING USE OF THE SAME

This application is a continuation of application Ser. No. 07/490,511 filed Mar. 1, 1990, now abandoned, which is a continuation of application Ser. No. 07/330,801 filed Mar. 30, 1989, now abandoned.

BACKGROUND OF THE INVENTION

1. Field of the Invention

The present invention relates to a polymer-gel-coated conductor which is suitable for use as a functional electrode or a functional material. The invention also is concerned with a method of producing the polymer-gel-coated conductor and also with an electric cell making use of the polymer-gel-coated conductor.

2. Description of the Prior Art

Characteristics of an electrode, particularly an electrode which is used in a liquid, are significantly influenced by the state of the surface of a conductive material from which the electrode is made.

Attempts have therefore been made to improve the characteristic of an electrode by modifying the nature of the surface of the electrode. For instance, it is a common measure to use a platinum electrode the surface of which has been modified to generate platinum black. Such a modification of the surface increases the true surface area so as to promote adsorption of a material on the surface, thus smoothing the reaction of the electrode.

In general, a metallic material can be formed to have a large surface area provided that its salt is reduced on a suitable interface. For instance, when a copper piece is immersed in a thick aqueous solution of a silver salt, a structure known as "silver dendrite". This dendritic structure provides a greater surface area for its appearance and, therefore, is considered as being suitable for use as an electrode, an adsorbent or a surface catalyst. However, the bulky dendritic structure is generally difficult to handle because the bulky dendritic structure exhibits an inferior mechanical strength. For these reasons, it has been a common measure to adopt a surface condition as a compromise of two incompatible demands: namely, demand for a greater surface area and a demand for a higher mechanical strength. A similar problem also is encountered with the case of inorganic materials.

On the other hand, organic conductive polymeric materials have been known which exhibit high levels ion adsorption/discharge efficiency, i.e., efficiency of doping-undoping process, when redoxed, i.e., when reduced and oxidized. The problem concerning the incompatibility of the surface structure and the mechanical strength is serious also in this type of material.

SUMMARY OF THE INVENTION

Accordingly, an object of the present invention is to overcome the above-described problems encountered with the prior art.

To this end, the present invention in its one aspect provides a polymer-gel-coated conductor comprising a conductor member and a cross-linked polymer in a gel state, the polymer in gel state coating the conductor member, wherein an oxidation product or a reduction product of an organic matter or an inorganic matter has been precipitated on the surface of the conductor member or in the region of the polymer in gel state near the surface of the conductor member.

The invention provides in its another aspect a method of producing a polymer-gel-coated conductor comprising the steps of: coating a conductor member with a cross-linked polymer in gel state; and oxidizing or reducing an organic matter or an inorganic matter by using the conductor member as an anode, a cathode or a catalyst, thereby causing the oxidation product or the reduction product on the surface of the conductor member and/or in the region of the polymer in the vicinity of the surface of the conductor member.

The invention also provides a polymer electric cell in which at least one of electrodes is constituted by a polymer-gel-coated conductor.

DESCRIPTION OF THE PREFERRED EMBODIMENTS

Figure 1:
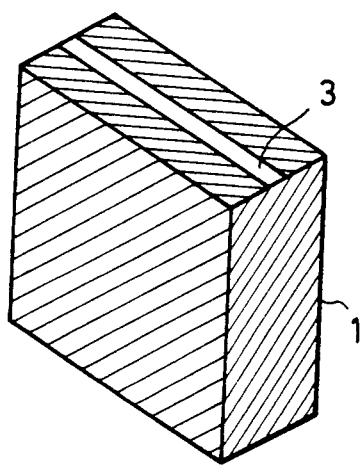
FIGS. 1 to 3 and FIGS. 4 to 6 are illustrations of the methods of the present invention for producing a coated conductor in accordance with the present invention.

According to the present invention, a cross-linked polymer in a gel state is used as the polymer for coating a conductor. The term "gel" is used in this specification to mean a state of a three-dimensional network polymer swelled upon absorption of a liquid which is capable of causing the polymer to swell. From a microscopic point of view, the "gel" state is equivalent to a state in which the polymer has been dissolved in the above-mentioned liquid. Thus, the solvent molecules in the liquid and the tiny molecules of the solute can freely move through the "gel". From a macroscopic point of view, however, the "gel" state does not exhibit fluidity due to the three-dimensional network structure of the polymer. The term "cross-link" means a state in which a local portion of a polymer chain has a chemical or a physical bond with another polymer.

According to the invention, the coated conductor is treated as an anode, a cathode or a catalyst so that the organic or inorganic matter contained in the polymer gel is oxidized or reduced and the oxidation product or reduction product is caused to precipitate in the region of the polymer gel on or near the conductor. Preferably, the polymer used in the present invention contains an electrolyte. The oxidative product or the reduction product mentioned above may be produced by making use of the electrolyte.

The material of the conductor usable in the present invention is, preferably but not exclusively, platinum, zinc and copper.

The cross-linked polymer suitably used in the present invention is a material which contains as its major component a synthetic polymer such as polyacrylamide, polyisopropylacrylamide, polyacrylate, polymethacrylate, polymethacryl amide, polyvinyl pyrolidone, polyvinyl alcohol, and so forth. Any cross-linked polymer exhibiting a gel state such as agar or gelatin state can also be used as the cross-linked polymer in the present invention. Any type of electrolyte capable of being ionized in the solvent can be used as the electrolyte contained in the polymer. The organic or inorganic matter to be oxidized or reduced is selected in accordance with the reaction product to be obtained. For instance, polyaniline can be precipitated by anodeoxidizing an aqueous solution of aniline sulfonic acid. Similarly, zinc can be precipitated by effecting a cathode reduction on an aqueous solution of zinc sulfate.

Various other reaction products can be precipitated in the polymer. For instance, organic reaction products such as polypyrrole, polythiophene and polyindole can be obtained by using various organic monomers dissolved in a suitable electrolytic solution such as 0.1 mol $Bu_4NclO_4$ acetonitrile solution or an electrolytic solution of various sulfates, nitrates and chlorides. Products such as Fe, Ni and Cd are obtainable by a reducing reaction. It is thus possible to precipitate various oxidative or reduction products in the polymer.

The electrode thus treated becomes a polymer-gel-coated electrode in which an oxidation or reduction product on or near the surface of the conductor, the oxidation or reduction product exhibiting a high degree of bulkiness which can never be attained with other methods. The principle or mechanism of generation of such a bulky structure has not been clarified yet. It is, however, considered that the formation of the bulky structure is closely related to the presence of the swelled three-dimensional network structure of the polymer which restrains the diffusion of the reacting substances and the reaction product, as well as convection of the liquid, in the course of the oxidation or reduction in the polymer gel on the conductor.

The polymer gel not only affects the nature of the oxidation or reduction product but also serves to fix the product on the conductor surface and/or in the region near the conductor surface after the production. Thus, the polymer gel stiffens the bulky structure which is generally fragile, thus preventing breakage of the bulky product thereby stabilizing the same.

Inorganic materials such as metals and semiconductors, as well as organic conductors, serving as active surface catalysts are known. According to the invention, it is possible to obtain a polymer-gel coated conductor having a large specific area, i.e., a high catalytic effect.

The polymer-gel-coated conductor as a surface-modified electrode can widely be used in the field of electrochemical industry as an electrode having a large surface area.

Polymer gels are also known which vary their physical properties such as degree of swelling, hardness and so on in accordance with changes in the conditions of the liquid such as pH value, composition and so forth. When the coated conductor of the present invention is produced with such a polymer gel, the physical property such as the swelling degree, hardness and so forth is changed without delay after the catalytic reaction or electro-chemical reaction.

The present invention also provides an electric cell. The electric cell of the present invention has an electrode which is formed by coating a conductor such as of platinum, zinc, copper and so forth with a cross-linked polymer gel and effecting an anodic or cathodic treatment on the polymer-coated conductor so as to cause an oxidation product or a reduction product to precipitate on the surface of the conductor or in the portion of the polymer near the conductor surface. This polymer-gel-coated electrode, serving as a first electrode, is electrically connected to a suitable other electrode serving as the second electrode, by means of a salt bridge, an ion exchanging resin film or an electrolytic solution, thus forming a polymer cell of the present invention.

In the electric cell of the present invention, both the first and second electrodes may be the polymer-gel-coated electrodes in accordance with the present invention. An electric cell having no potential difference is obtained by using a pair of electrodes which are equivalent to each other.

Conversely, both polymer-gel-coated electrodes produced by the same process can have different potentials, if the composition of the liquid contained in the polymer gel of one of the electrodes, e.g., kind or density of the electrolyte dissolved in the polymer gel, is varied from that of the other electrode, or if an operation such as electro-chemical reduction or oxidation for changing the state of oxidation is effected on one of the electrodes. Obviously, two polymer-gel-coated electrodes produced by the method of the present invention can have different potentials when they contain oxidation or reduction products of different types of organic or inorganic matters.

The polymer-gel-coated electrodes thus produced develop a potential difference therebetween, when connected to each other by means of a salt bridge, ion exchanging resin film or an electrolytic solution.

The electrolyte, when present in the cross-linked polymer gel coating layer used in the present invention, not only fixes the electrode active substance, e.g., the organic conductive polymer, but also provides an electrolyte carrier which is rich in the electrolyte but does not exhibit substantial fluidity.

Furthermore, the electrode reaction occurs uniformly over the entire portion of the electrode because the electrolyte uniformly exists in the gel, as well as in the interface between the gel and the electrode. The polymer gel can effectively function electro-chemically because the oxidation or reduction product also exists uniformly and, in some cases, continuously, on the conductor surface or in the region of the gel near the conductor surface. The electric cell of the present invention can be formed by electrically connecting a pair of thus formed polymer-gel-coated electrode by means of, for example, a salt bridge, an ion exchanging resin film or an electrolytic solution. The polymer gel composed of a cross-linked polymer can have such a function that its properties such as degree of swelling and hardness vary in response to an external signal such as heat or salt density.

Examples of the present invention will be described with reference to the accompanying drawings in which numeral 1 denotes a mold made of, for example, a glass, while 2 denotes a conductor such as of platinum. A numeral 3 denotes a slit. A polymer in the form of a gel is indicated at 4. A platinum electrode coated with a gel containing precipitate of reduced polyaniline is denoted by 5, while a platinum electrode coated with a gel containing precipitate of polyaniline after anode oxidation is designated at 6. Numerals 7 and 8 denote, respectively, a salt bridge and an aqueous solution of zinc sulfate. Numerals 9 and 10 denote, respectively, a zinc plate and a copper plate. Numerals 11 and 12 denote, respectively, a copper plate coated with a gel containing zinc precipitate and a copper plate coated with a gel containing copper precipitate. A potentiometer is denoted by 13.

EXAMPLE 1

Figure 3:
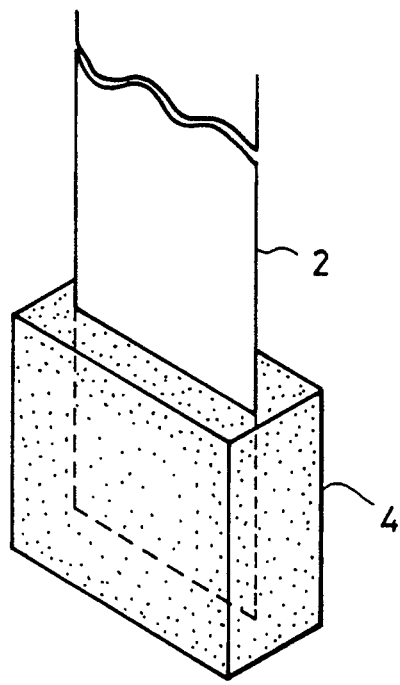

A mold 1 as shown in FIG. 1 was formed by cutting a sheet of glass (Micro Slide Glass S-1111 manufactured by Matsunami Glass Ind. Ltd.) having a thickness of 0.8 to 1.0 mm into pieces of suitable sizes and bonding these pieces with Aron Alpha which is a registered trademark of a cyanoacrylate adhesive manufactured by Toa Gosei Chemical Industry. A platinum plate 2 (manufactured by Tanaka Kikinzoku Kogyo Kabushiki Kaisha) of 10 mm wide, 40 mm long and 0.02 mm thick was inserted into a slit 3 (1 mm wide and 12 mm long) of the mold 1 such that the lower edge of the platinum plate 1 was stationed at a level 1 to 2 mm above the bottom of the mold 1. A liquid A was prepared by dissolving, in 9 ml of water, 0.5 g of N-isopropyl acrylamide, 7.5 mg of sodium acrylate and 13.3 mg of N.N'-methylene bis-acrylamide, sufficiently bubbling the aqueous solution with nitrogen, and adding 6 $\mu$l of N, N, N', N'-tetramethyl ethylenediamine. On the other hand, a liquid B was prepared by dissolving 1 mg of ammonium persulfate in 1 ml of water. Liquids A and B were mixed with each other, and immediately after mixing, the mixture was poured by an injector to fill the space under the slit 3 up to a level of 10 mm from the bottom by means of an injector through the gap between the platinum plate 2 and the edge of the slit 3. The mixture liquid was then left in a nitrogen atmosphere so as to gelate. The mold together with the gelated substance was dipped in hot water of 80° C. As a result, the adhesive was softened to allow the pieces of glass sheet to be freed from one another and, at the same time, the gel was made to contract to come off the glass pieces, whereby the platinum plate coated by the gel 4, usable as a functional material which varies its degree of swelling in response to a change in temperature and pH, was separated as shown in FIG. 3.

Then, 1.0 g of aniline was dissolved in 300 ml of 1N sulfuric acid whereby an aqueous solution was prepared. The above-mentioned gel-coated platinum plate was immersed in this aqueous solution for 24 hours. Then, the gel-coated platinum plate was fixed such that the portion coated with the gel is immersed in an aqueous solution of aniline and sulfuric acid of the same concentration as the above-mentioned aqueous solution, while the portion not coated with the gel was exposed above the surface of the solution. Then, an electrolytic polymerization reaction was effected with a constant electric current of 3 mA in a nitrogen atmosphere, using the above-mentioned platinum plate as an anode and another platinum plate as an opposing electrode. In consequence, numerous polyaniline filaments grew from the surface of the anode platinum plate into the gel coating this platinum plate and, after 40-minute reaction, polyaniline spread in a substantially cloud-like form over the entire portion of the platinum plate. The polyaniline filaments in cloud-like form never did come off the platinum plate because they were fixed by the gel. The platinum plate coated with the gel including the cloud-like polyaniline filaments was subjected to a 5-minute rinsing with water but no substantial change was caused in the nature of the gel. Sulfuric acid ions which are electrolytic components remain in the gel. It was confirmed that these ions function as a pH modulator.

The thus formed gel-coated polyaniline/platinum electrode was immersed in a 0.3 M sodium sulfate aqueous solution and an electric potential of +0.5 V to −0.1 V was imparted to the electrode. In consequence, an oxidation or reduction was caused depending on the potential so as to cause the gel to expand or contract.

EXAMPLE 2

Figure 5:
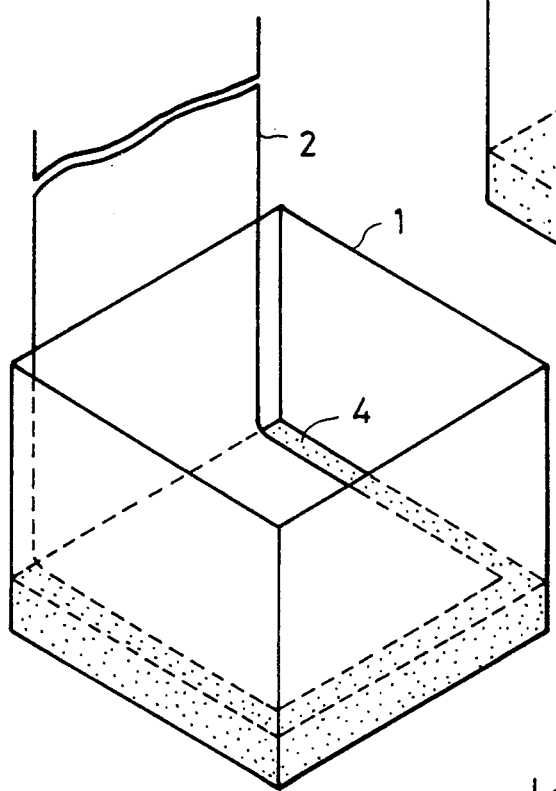
Figure 4:
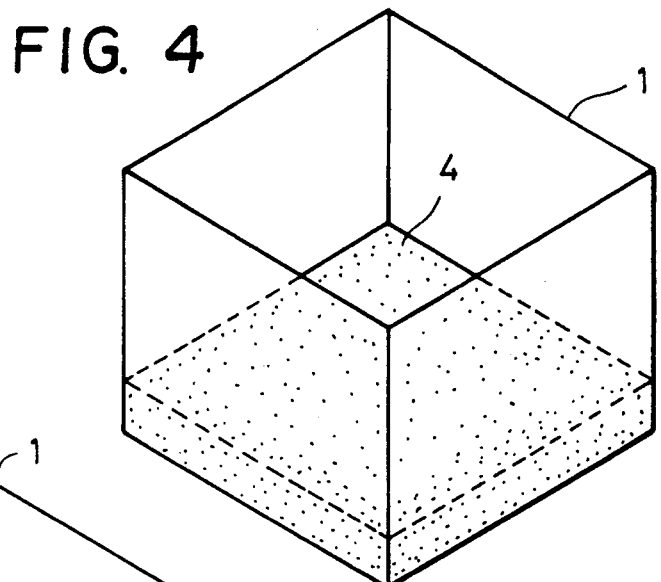
Figure 6:
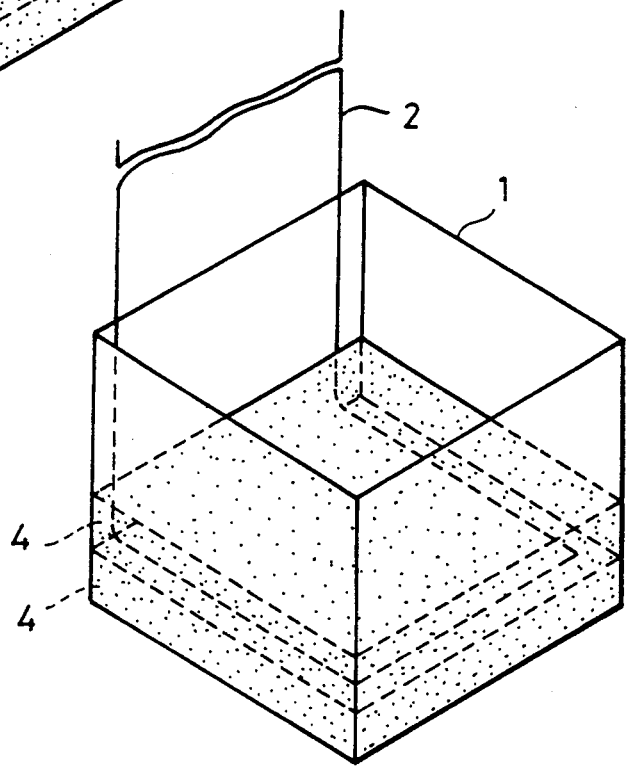

The form and the material of the mold 1 used in Example 1 are not exclusive. In Example 2, a mold as shown in FIG. 4 was formed from an acrylic plate, and a liquid mixture of liquids A and B was poured into the mold to fill the cavity to a depth of 2 mm. The mixture liquid was then allowed to gelate. Then, a platinum plate 2 was placed in a manner shown in FIG. 5 and then the mixture liquid composed of the liquids A and B was poured to a thickness of 2 mm and then left to gelate as shown in FIG. 6, whereby a gel-coated conductor was obtained. Then, the same process as that in Example 1 was conducted thereby forming a gel-coated conductor coated with a gel having aniline precipitated therein.

COMPARISON EXAMPLE 1

A platinum plate having no coating gel was tested as follows for the purpose of comparison with Example 1. More specifically, a naked platinum plate having no coating gel thereon was subjected to an electrolytic polymerization with an electric current of 3 mA in an aqueous solution of aniline and sulfuric acid of the same concentration as that used in Example 1. The polymerization reaction was continued for 40 minutes so that a thin layer of polyaniline of a high density was formed on the surface of the platinum, in contrast to Example 1. This layer partially came off the platinum plate when the latter was taken out of the solution. The platinum plate was then immersed in a 0.1N sodium sulfate and subjected to a cyclic voltammetry. The peak current was about ½ that in Example 1. When the platinum was water-rinsed, almost all part of the polyaniline layer came off the platinum plate, thus proving an inferior bonding strength of the polyaniline.

EXAMPLE 3

An 1N zinc sulfate aqueous solution was used in place of the aniline-containing sulfuric acid aqueous solution used in Example 1. Namely, a gel-coated platinum plate was immersed in 300 ml of the 1N zinc sulfate aqueous solution for 24 hours. The platinum plate was then fixed in an 1N zinc sulfate aqueous solution in the same manner as Example 1. Using this platinum plate as a cathode while using another platinum plate as an anode, a voltage of −2.5 V was applied to reduce the cathode. In consequence, zinc was made to precipitate on the surface of the cathodic platinum plate, as well as in the region of the gel near the surface of the platinum plate. The zinc thus precipitated had a surface area which was apparently greater than that obtained by an ordinary galvanizing or zinc plating process. This gel-coated platinum, therefore, offers advantages such as small tendency of polarization in response to supply of an electric current when used as an electrode.

EXAMPLE 4

Examples 1 to 3 employed a chemically cross-linked gel composed of the liquids A and B. In Example 4, however, a gel in which cross-linkage is formed by intermolecular force was used. More specifically, a gel derived from an aqueous solution of agar or gelatin. In each case, potassium chloride was added as an electrolyte in each case, so that a gel-coated platinum plate was obtained. This plate was then treated in the same manner as Example 1, whereby a polymer-coated conductor coated with a gel containing polyaniline precipitated therein was obtained.

EXAMPLE 5

Figure 2:
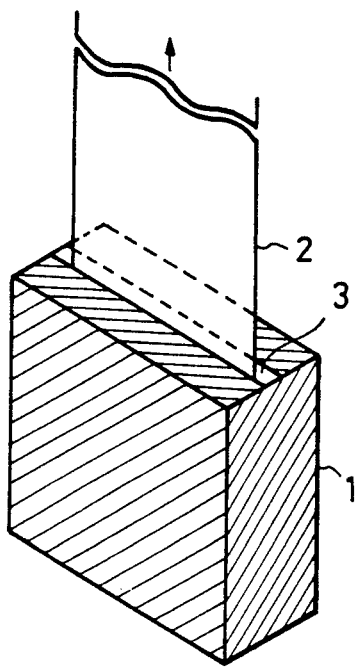

A glass sheet (Micro Slide Glass S-1111 manufactured by Matsunami Glass Ind. Ltd.) having a thickness of 0.8 to 1.0 mm was cut into pieces of suitable sizes and the pieces were bonded together with Aron Alpha (registered trademark of a cyanoacrylate adhesive produced by Toa Gosei Chemical Industry), whereby a mold 1 of 5 mm wide, 12 mm long and 12 mm deep was obtained as shown in FIG. 1. Then, a platinum plate 2 (manufactured by Tanaka Kikinzoku Kogyo Kabushiki Kaisha) of 10 mm wide, 40 mm long and 0.02 mm thick was inserted into a slit 3 (1 mm wide and 12 mm long) of the mold 1 as shown in FIG. 2, such that the lower edge of the platinum plate 1 was stationed at a level 1 to 2 mm above the bottom of the mold 1. A liquid A was prepared by dissolving, in 9 ml of water, 0.5 g of N-isopropyl acrylamide, 7.5 mg of sodium acrylate and 13.3 mg of N.N'-methylene bis-acrylamide, sufficiently bubbling the aqueous solution with nitrogen, and adding 6 $\mu$l of N, N, N', N'-tetramethyl ethylenediamine. On the other hand, a liquid B was prepared by dissolving 1 mg of ammonium persulfate in 1 ml of water. Liquids A and B were mixed with each other than, immediately after mixing, the mixture was poured by an injector to fill the space under the slit 3 up to a level of 10 mm from the bottom by means of an injector through the gap between the platinum plate 2 and the edge of the slit 3. The mixture liquid was then left in a nitrogen atmosphere so as to gelate. The mold together with the gelated substance was dipped in hot water of 80° C. As a result, the adhesive was softened to allow the pieces of glass sheet to be freed from one another and, at the same time, the gel was made to contract to come off the glass pieces, whereby the platinum plate 2 coated by the gel 4 was separated as shown in FIG. 3.

Then, 1.0 g of aniline was dissolved in 300 ml of 1N sulfuric acid whereby an aqueous solution was prepared. The above-mentioned gel-coated platinum plate was immersed in this aqueous solution for 24 hours. Then, the gei-coated platinum plate was fixed such that the portion coated with the gel is immersed in an aqueous solution of aniline and sulfuric acid of the same concentration as the above-mentioned aqueous solution, while the portion not coated with the gel was exposed above the surface of the solution. Then, an electrolytic polymerization reaction was effected with a constant electric current of 3 mA in a nitrogen atmosphere, using the above-mentioned platinum plate as an anode and another platinum plate as an opposing electrode. In consequence, numerous polyaniline filaments grew from the surface of the anode platinum plate into the gel coating this platinum plate and, after 40-minute reaction, polyaniline spread in a substantially cloud-like form over the entire portion of the cloud. The polyaniline filaments in cloud-like did never come off the platinum plate because they were fixed by the gel. The platinum plate coated with the gel including the cloud-like polyaniline filaments was subjected to a 5-minute rinsing with water but no substantial change was caused in the nature of the gel. Sulfuric acid ions which are electrolytic components remained in the gel.

Figure 7:
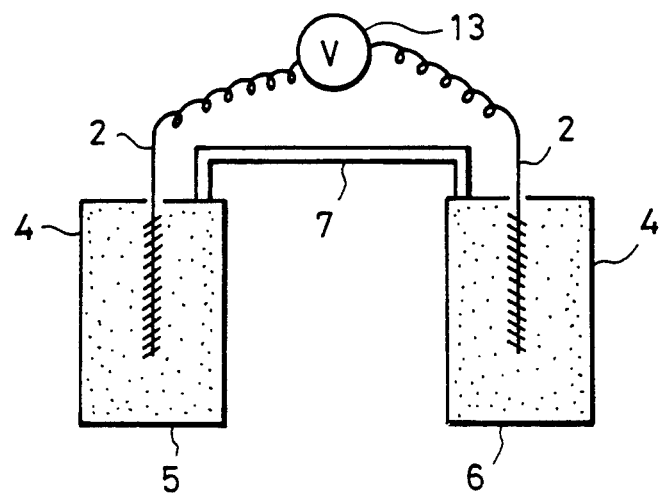
FIGS. 7, 8 and 9 are schematic illustrations of an electric cell incorporating a conductor of the present invention.

A pair of polymer-coated electrodes were prepared through the described process. One of these electrodes was subjected to a 5-minute reducing reaction which was conducted in an 1N sodium sulfate under application of a potential of −0.5 V (vs. SCE) thereto, while using another platinum plate as an opposing electrode, whereby an electrode 5 was obtained. This electrode will be referred to as "PAn.red", hereinafter. It was confirmed that polyaniline together with the gel was firmly maintained on the platinum plate despite the reducing reaction. The PA.red 5 was electrically connected to the other electrode 6 (referred to as "PAn.ox") which has not been subjected to reduction, through a salt bridge containing saturated KCl, whereby a potential difference of about 0.5 V was generated between these electrodes. Thus, an electric cell was formed as shown in FIG. 7. After allowing the cell to discharge, the cell was charged with a voltage of 1 V applied between the PAn.red serving as a negative (−) electrode and the PAn.ox 6 serving as a positive (+) electrode. In consequence, the cell was charged to a level which enables the cell to discharge again.

EXAMPLE 6

The form and the material of the mold used in Example 5 are not exclusive. A frame as shown in FIG. 4 was therefore fabricated from pieces of acryl sheet and the mixture liquid composed of the liquids A and B used in Example 5 were poured into the mold to a depth of 2 mm. Then, a platinum plate 2 was set in a manner shown in FIG. 5 and the mixture liquid composed of the liquids A and B was charged to a thickness of 2 mm. The mixture liquid was then allowed to gelate as shown in FIG. 6 and the same process as Example 5 was to allow precipitation of aniline. Then, an electric cell was produced using two such coated platinum plates in the same manner as Example 5.

COMPARISON EXAMPLE 2

For the purpose of comparison with Example 1, a platinum plate having a polyaniline layer formed thereon was prepared in the same manner as Comparison Example 1, and an electric cell was produced with two such coated platinum plates in the same manner as Example 5. This cell, however, showed an impractically low level of efficiency and could not put to actual use.

EXAMPLE 7

Figure 8:
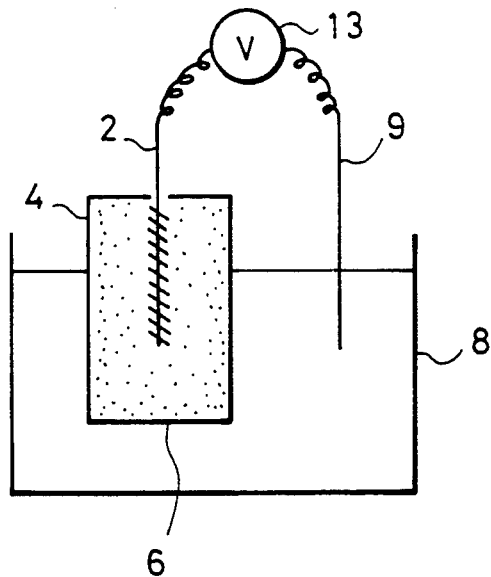

A gel-coated electrode (PAn.ox) coated with a gel containing polyaniline as prepared in Example 5 was immersed in a 0.1 M zinc sulfate aqueous solution 8 together with a zinc plate 9 serving as an opposing electrode, and the voltage between these plates was measured as shown in FIG. 8. The measured value of the voltage was 0.5 V.

EXAMPLE 8

A zinc plate in place of the platinum plate used in Example 5 was coated with a gel. The gel-coated zinc plate 11 was immersed for 24 hours in 300 ml of 1N zinc sulfate aqueous solution which was used in place of the aqueous solution of aniline and sulfuric acid in Example 5. Then, the gel-coated zinc plate 11 was fixed in an 1N zinc sulfate aqueous solution in the same manner as Example 5 together with a platinum plate. A voltage of −1.8 V was applied to the gel-coated zinc plate serving as a cathode, while using the platinum plate as an opposing electrode, so that zinc was made to precipitate on the surface of the zinc plate and in the region of the gel near the zinc plate surface. The zinc thus precipitated showed an apparently large surface area than that obtained through an ordinary galvanizing or zinc plating process. It was confirmed also that the precipitated zinc showed a small tendency of polarization when used as an electrode.

Figure 9:
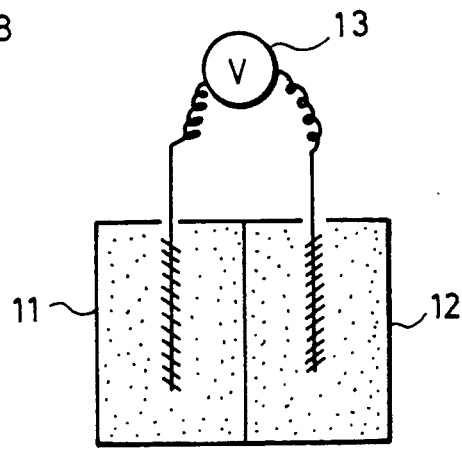

Similarly, a gel-coated copper plate 12 was reduced in an 1N copper sulfate aqueous solution so as to cause copper to precipitate in the gel. The gel-coated electrode with the zinc precipitate and the gel-coated electrode with the copper precipitate were brought together such that they contact each other at their coating layers, and potential difference between both plates was measured. The measured value of the potential difference was about 1 V. (see FIG. 9)

EXAMPLE 9

A gel was prepared by heat-dissolving 1 g of agar in 100 cc of saturated potassium chloride and then cooling the solution. Using this gel in place of the gel formed from the mixture of the liquids A and B in Example 5, a polymer electric cell having electrodes composed of polymer-gel-coated conductors was produced by the same process as Example 5. This cell showed a potential difference of about 0.5 V between these electrodes.

EXAMPLE 10

A polymer electric cell was produced by the same process as Example 9, except that 5 g of gelatin was used in place of the agar and that an aqueous solution of L-sodium glutamate was used in place of the aqueous solution of potassium chloride. The cell showed a potential difference of about 0.5 V between two electrodes.

As will be fully understood from the foregoing description, according to the present invention, a gel composed of a cross-linked polymer coating a conductor remarkably facilitates fixation of an organic conductive material such as polyaniline, polypyrrole and polythiophene on the conductor, with high degrees of reproducibility and uniformity of the coating gel.

The coating gel may be a polymer gel which is capable of changing its property such as swelling degree in response to a change in pH value. When the polymer-gel-coated electrode coated with such a gel is used in combination with a substance which can serve as a pH modulator, e.g., polyaniline, polypyrrole and so forth, the nature or the state of the coating gel can easily be controlled.

Furthermore, the polymer-gel-coated conductor of the invention, in which an organic or inorganic conductive products are uniformly formed in the coating gel of the cross-linked polymer, can suitably be used as an electrode in a plating process or in a cell, with a high efficiency of electrode reaction by virtue of the fact that a large electrode area can be obtained with a limited volume of the gel. The polymer-gel-coated conductor of the invention may be used as at least one of two electrodes of a polymer cell. Such a polymer cell does not necessitate any liquid electrolyte and, hence, none of the components of such a cell exhibit any fluidity, because the coating polymer itself contains an electrolyte. For the same reason, the oxidation or reduction reaction takes place uniformly and efficiently in such a polymer cell.

What is claimed is:

1. A polymer-gel-coated conductor comprising a conductor member and a cross-linked polymer in a gel state, said polymer in gel state coating said conductor member, wherein an oxidation product or a reduction product of an inorganic matter has been precipitated on the surface of said conductor member or in the region of said polymer in gel state near the surface of said conductor member said oxidation product or reduction product of an inorganic matter is one selected from a group consisting of zinc, copper, mercury, iron, nickel and cadmium.

2. A polymer-gel-coated conductor according to claim 1, wherein said conductor member is made of a material selected from a group consisting of platinum, zinc and copper.

3. A polymer-gel-coated conductor according to claim 1, wherein said polymer contains as its major component, a substance selected from a group consisting of polyacrylamide, polyisopropylacrylamide, polyacrylate, polymethacrylate, polymethacryl amide, polyvinylpyrrolidone, polyvinyl alcohol, agar and gelatin.

4. A polymer-gel-coated conductor according to claim 1, wherein said polymer in gel state contains an electrolyte.

5. A method of producing a polymer-gel-coated conductor comprising the steps of:
    coating a conductor member with a cross-linked polymer in a gel state by immersing said conductor member in a solution of polymerizable material which produces said cross-linked polymer; and
    oxidizing or reducing an inorganic matter by using said conductor member as an anode, a cathode or a catalyst, thereby forming an oxidation product or a reduction product on a surface of said conductor member and/or in a region of said polymer in the vicinity of said surface of said conductor member.

6. A method according to claim 5, wherein said polymer in gel state contains an electrolyte.

7. A polymer electric cell comprising a pair of electrodes at least one of which is made of a polymer-gel-coated conductor having a conductor member and a crosslinked polymer in a gel state, said polymer in gel state coating said conductor member and containing an electrolyte, wherein a oxidation product or a reduction product of an inorganic matter has been precipitated on the surface of said conductor member or in the region of said polymer in gel state near the surface of said conductor member said oxidation product or reduction product of an inorganic matter is one selected from a group consisting of zinc, copper, mercury, iron nickel and cadmium.

8. A polymer electric cell according to claim 7, wherein said electrodes are made of polymer-gel-coated conductors, the coating polymer of both electrodes containing different electrolytes.

9. A polymer electric cell according to claim 7, wherein said conductor member is made of a material selected from a group consisting of platinum, zinc and copper.

10. A polymer electric cell according to claim 7, wherein said polymer contains, as its major component, a substance selected from a group consisting of polyacrylamide, polyisopropylacrylamide, polyacrylate, polymethacrylate, polymethacryl amide, polyvinylpyrrolidone, polyvinyl alcohol, agar and gelatin.

11. A polymer-gel-coated conductor according to claim 1, wherein said cross-linked polymer in a gel state is a cross-linked polymer capable of absorbing a liquid.

12. A polymer electric cell according to claim 7, wherein said cross-linked polymer in a gel state is a cross-linked polymer capable of absorbing a liquid.

13. A method of producing a polymer-gel-coated conductor according to claim 5, wherein said conductor member is made of a material selected from a group consisting of platinum, zinc and copper.

14. A method of producing a polymer-gel-coated conductor according to claim 5, wherein said polymer contains as its major component, a substance selected from a group consisting of polyacrylamide, polyacrylate, polymethacrylate, polymethacrylamide, polyvinylpyrrolidone, polyvinyl alcohol, agar and gelatin.

15. A method of producing a polymer-gel-coated conductor according to claim 5, wherein said oxidation product or reduction product of an inorganic matter is one selected from a group consisting of zinc, copper, mercury, iron, nickel and cadmium.

16. A polymer electric cell comprising a pair of electrodes, wherein at least one electrode is a polymer-gel-coated conductor produced by a method comprising the steps of:

coating a conductor member with a cross-linked polymer in a gel state by immersing said conductor member in a solution of polymerizable material which produces said cross-linked polymer; and oxidizing or reducing an inorganic matter by using said conductor member as an anode, a cathode or a catalyst, thereby forming an oxidation product or a reduction product on a surface of said conductor member and/or in a region of said polymer in the vicinity of said surface of said conductor member.

17. A polymer electric cell according to claim 16, wherein said pair of electrodes are made of polymer-gel-coated conductors, the coating polymer of both electrodes containing different electrolytes.

18. A polymer electric cell according to claim 16, wherein said conductor member is made of a material selected from a group consisting of platinum, zinc and copper.

19. A polymer electric cell according to claim 16, wherein said polymer contains as its major component, a substance selected from a group consisting of polyacrylamide, polyacrylate, polymethacrylate, polymethacrylamide, polyvinyl pyrolidone, polyvinyl alcohol, agar and gelatin.

20. A polymer electric cell according to claim 16, wherein said oxidation or reduction product of an inorganic matter is one selected from a group consisting of zinc, copper, mercury, iron, nickel and cadmium.

* * * * *

UNITED STATES PATENT AND TRADEMARK OFFICE
CERTIFICATE OF CORRECTION

PATENT NO. : 5,166,008
DATED : November 24, 1992
INVENTOR(S) : YOSHINORI TOMIDA, ET AL.

It is certified that error appears in the above-identified patent and that said Letters Patent is hereby corrected as shown below:

TITLE PAGE

IN [63] RELATED U.S. APPLICATION DATA

"Ser. No. 490,511," should read
    --Ser. No. 490,511, filed Mar. 1, 1990, abandoned,--.

IN [56] REFERENCES CITED

Under OTHER PUBLICATIONS, "Commum." should read --Commun.--.

IN [57] ABSTRACT

Line 9, "polymer-gel coated" should read
        --polymer-gel-coated--.

COLUMN 1

Line 37, ""silver dendrite"." should read
        --"silver dendrite" is formed.--.

COLUMN 2

Line 51, "oxidative" should read --oxidation--.
    Line 61, "polyvinyl pyrolidone," should read
        --polyvinylpyrrolidone,--.

COLUMN 3

Line 2, "anodeoxi-" should read --anode-oxi- --.
    Line 4, "cathode" should read --cathode- --.
    Line 15, "tive" should read --tion--.

UNITED STATES PATENT AND TRADEMARK OFFICE
CERTIFICATE OF CORRECTION

PATENT NO. : 5,166,008
DATED : November 24, 1992
INVENTOR(S) : YOSHINORI TOMIDA, ET AL.

It is certified that error appears in the above-identified patent and that said Letters Patent is hereby corrected as shown below:

COLUMN 4

Line 44, "electrode" should read --electrodes--.

COLUMN 5

Line 13, "plate 1" should read --plate 2--.

COLUMN 6

Line 42, "An" should read --A--.
   Line 47, "an" should read --a--.
   Line 68, "lyte in each case," should read --lyte,--.

COLUMN 7

Line 19, "plate 1" should read --plate 2--.
   Line 28, "than," should read --and,--.
   Line 59, "cloud" should read --platinum plate--.

COLUMN 8

Line 2, "an" should read --a--.
   Line 9, "PA.red 5" should read --PAn.red 5--.
   Line 32, "was" should read --was performed--.
   Line 44, "put" should read --be put--.
   Line 62, "an" should read --a--.

COLUMN 9

Line 2, "large" should read --larger--.
   Line 8, "an" should read --a--.
   Line 29, "xcept" should read --except--.

UNITED STATES PATENT AND TRADEMARK OFFICE
CERTIFICATE OF CORRECTION

PATENT NO.   : 5,166,008
DATED        : November 24, 1992
INVENTOR(S)  : YOSHINORI TOMIDA, ET AL.

It is certified that error appears in the above-identified patent and that said Letters Patent is hereby corrected as shown below:

<u>COLUMN 10</u>

Line 15, "contains" should read --contains,--.
    Line 41, "crosslinked" should read --cross-linked--.
    Line 43, "a" (first occurrence) should read --an--.
    Line 49, "iron" should read --iron,--.
    Line 62, "polyisopropylacrylamide," should read --polyisopropylacrylamide,--.

<u>COLUMN 11</u>

Line 11, "contains" should read --contains,--.

<u>COLUMN 12</u>

Line 18, "contains" should read --contains,--.
    Line 21, "polyvinyl pyrolidone," should read --polyvinylpyrrolidone,--.

Signed and Sealed this

Fourteenth Day of December, 1993

*Attest:*

BRUCE LEHMAN

*Attesting Officer*    *Commissioner of Patents and Trademarks*